(12) United States Patent
Alleyne

(10) Patent No.: US 8,389,842 B2
(45) Date of Patent: Mar. 5, 2013

(54) SYSTEM AND METHOD FOR HANDLE GRIP IMPROVEMENT

(76) Inventor: Cleveland W. Alleyne, Glendale, CA (US)

( * ) Notice: Subject to any disclaimer, the term of this patent is extended or adjusted under 35 U.S.C. 154(b) by 246 days.

(21) Appl. No.: 12/804,067

(22) Filed: Jul. 12, 2010

(65) Prior Publication Data
US 2012/0006179 A1 Jan. 12, 2012

Related U.S. Application Data

(60) Provisional application No. 61/270,697, filed on Jul. 13, 2009.

(51) Int. Cl.
*G10D 13/02* (2006.01)
(52) U.S. Cl. ..................................... 84/422.4
(58) Field of Classification Search ............... 84/422.4
See application file for complete search history.

(56) References Cited

U.S. PATENT DOCUMENTS 5,179,237 A * 1/1993 Grossman .................. 84/422.4
5,855,479 A * 1/1999 Wong et al. .................. 433/102

* cited by examiner

*Primary Examiner* — Kimberly Lockett

(57) ABSTRACT

A system and method for improving the gripping surface of the handle of a manual tool, implement, or instrument. In a preferred embodiment the present invention includes one or more elastomeric bands stretched over the handle of the tool, implement, or instrument. A shrinkable sleeve is then placed over the bands and shrunk tightly over the handle. The result is a ribbed gripping surface on the handle to improve gripability of the tool, implement, or instrument. In another preferred embodiment, adhesive is used to secure the elastomeric band to the handle before shrinking the sleeve to improve precision in the placement of the rings and durability of the finished gripping surface.

9 Claims, 4 Drawing Sheets

SYSTEM AND METHOD FOR HANDLE GRIP IMPROVEMENT

This application claims priority from U.S. Provisional Application No. 61/270,169 filed Jul. 13, 2009.

BACKGROUND OF THE INVENTION

1. Field of the Invention

The present invention relates to a system and method for improving the gripping surface of a hand tool handle or implement. More particularly, but not by way of limitation, the invention provides a method for applying a rubber-like gripping surface on a drum stick, tool, or other implement, without significantly increasing the diameter of the handle.

2. Background of the Invention

Hand tools with wood, fiberglass, or even metal handles are well known in the art. Other implements, such as drumsticks, sporting equipment handles with similar gripping surfaces are likewise quite common. A trait of such tools is that the gripping surface of the handle is some what slick to start our with but becomes even more problematic as the user tires, the user's hands become sweaty, or the user fatigued. In such situations, tools are known to dangerously slip from the user's hand. In fact wooden implements may become even slicker over time as the user's hand wears the surface smoother and as skin oils are absorbed into the implement.

The problem is well recognized and there are a few solutions available. For example, hammers are commonly available with a fiberglass handle having a rubber grip. Many craftsman prefer wood handles over fiberglass handles and there are few options for applying grips to handles which have been manufactured without such a grip.

One solution sometimes employed is to dip the handle in a solution that leaves a rubbery coating over the grip. This solution has not been well received for a number of reasons. The technique requires a person to buy much more of the solution than is actually applied to achieve the dipping process, the material does not always adhere well and may actually make a tool more dangerous, the material runs to the lowest part of the handle and usually creates a "bump" in the handle at the lowest point, the process can objectionably increase the diameter of the gripping surface, and many materials "grow" with use and become loose on the handle. Such materials may also eventually shred, causing hand blistering.

In relation to drumsticks, percussion mallets, and the like, musicians have long preferred wooden implements, whether because of mass of the implement, the subjective feel, the sound produced by wood versus other materials, or simply even tradition, such implements can become quite slippery when the musician's hands become sweaty. To produce certain percussion effects, the musician may actually need a light grip on the implement, further compounding the problem.

It is thus an object of the present invention to provide a system and method for improving the gripping surface of a tool or implement which provides a secure gripping surface, is relatively inexpensive, easily applied and does not significantly increase the diameter of the handle.

SUMMARY OF THE INVENTION

In one preferred embodiment, the present invention provides a method for applying a grip material to the gripping surface of a tool, instrument, or implement comprising the steps of placing a shrinkable sleeve over the gripping surface of a tool, instrument, or implement, and shrinking the shrinkable sleeve until it tightly conforms to the surface of the tool instrument, or implement. In another preferred embodiment, prior to placing the shrinkable sleeve over the gripping surface, placing one, or more, elastomeric bands or o-rings over the gripping surface and then placing the shrinkable sleeve over the elastomeric material to provide an irregular surface for gripping.

In yet another preferred embodiment, a method is provided for applying a grip including the steps of: placing one or more elastomeric bands or rings around the gripping surface of a tool, instrument, or implement; placing a heat shrinkable sleeve over the gripping surface; applying heat to the heat shrinkable sleeve to shrink the sleeve around the gripping surface and to retain the elastomeric bands or rings; and placing the tool, instrument, or implement in a cooling fixture until the sleeve has cooled to a comfortable temperature.

In still another preferred embodiment, the present invention provides an improved gripping surface for a drumstick or percussion mallet of the type having a smooth gripping surface, the improvement comprising: an elastomeric band placed over the gripping surface; and a shrinkable sleeve placed over the elastomeric band wherein, after shrinking, the shrinkable sleeve provides a higher friction gripping surface having a raised area created by the elastomeric band.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
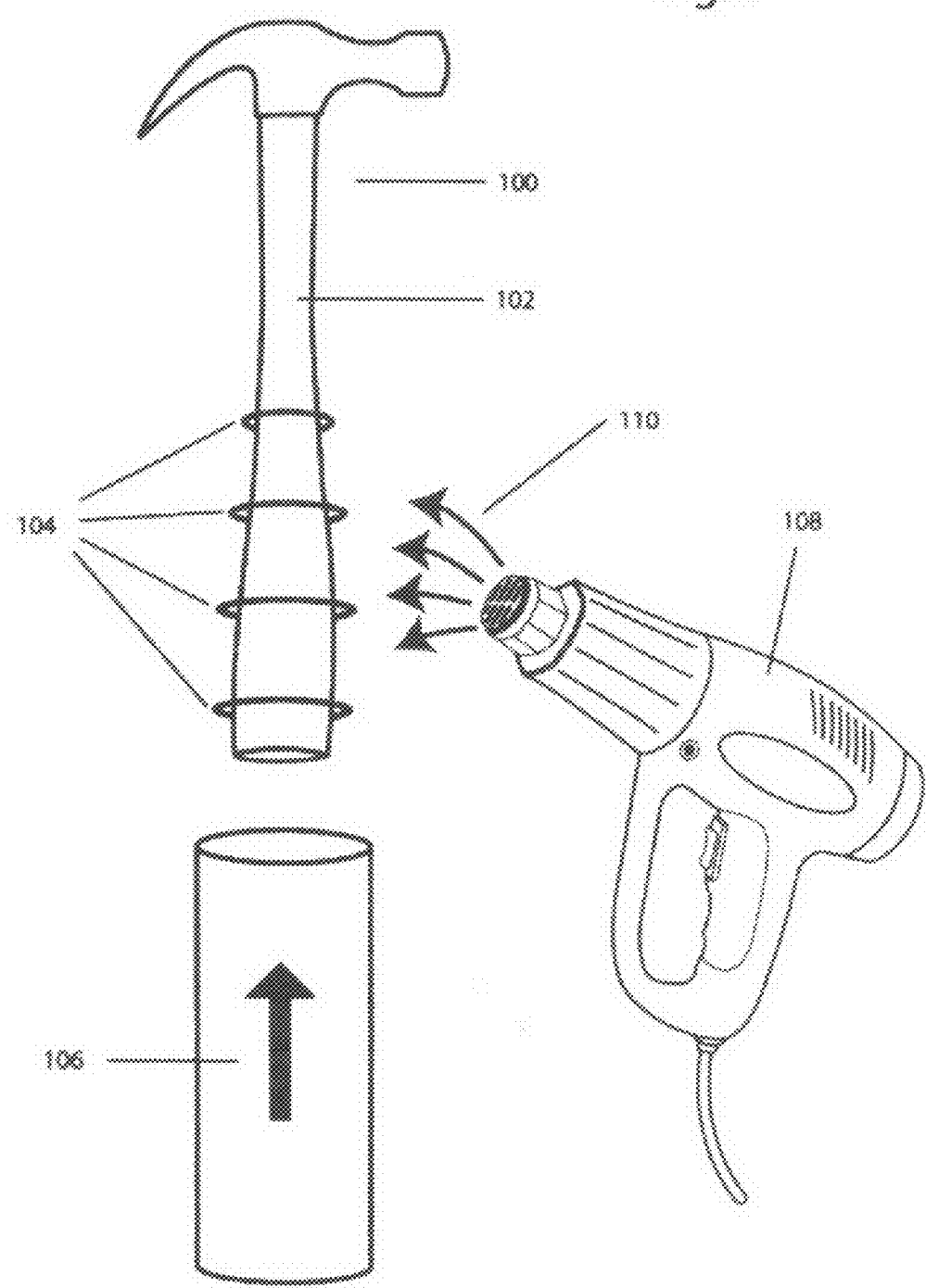
FIG. 1 depicts a preferred embodiment of the present invention as applied to a hammer prior to shrinking the sleeve.
Figure 4:
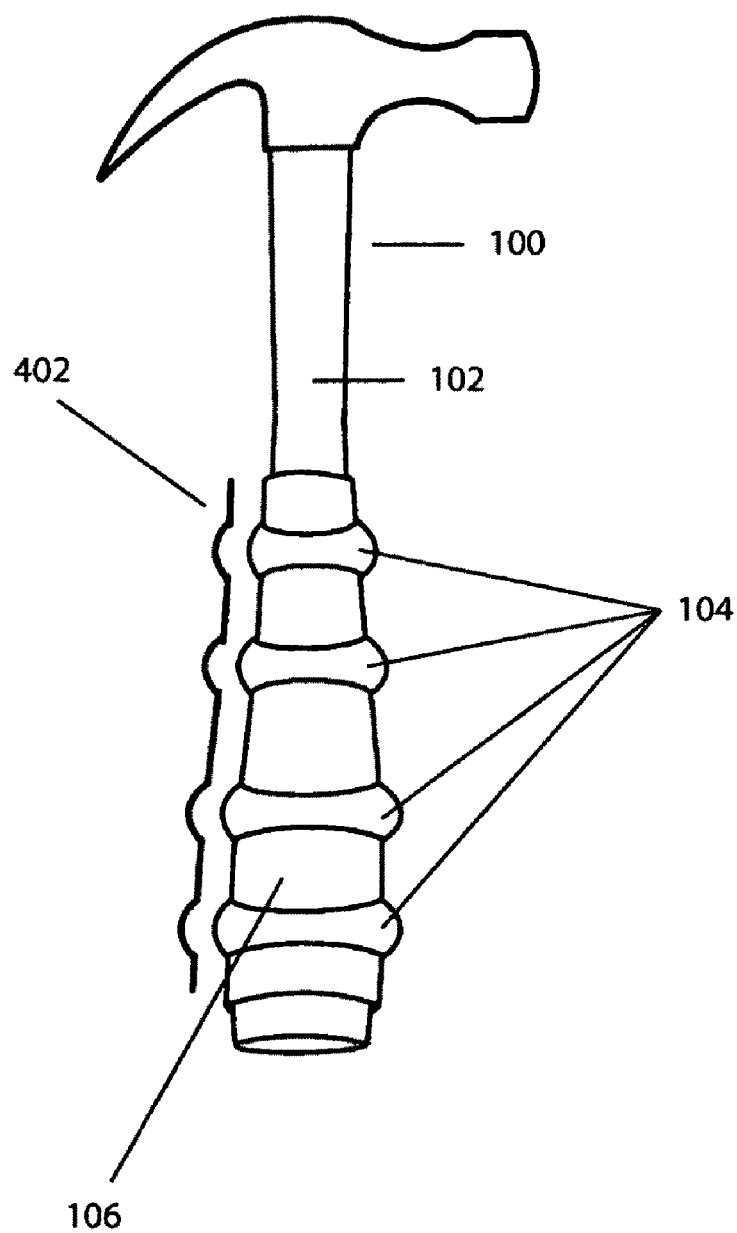
FIG. 4 depicts the hammer of FIG. 1 after shrinking of the sleeve.

Referring now to the drawings, wherein like reference numerals indicate the same parts throughout the several views, with reference to FIGS. 1 and 4, a traditional hammer 100 has an existing gripping surface 102 on its handle. In accordance with the present invention, one or more elastomeric bands 104, such as, rubber bands, or the like, are stretched over the handle 102. Afterward, shrinkable sleeve 106 is slid over the handle 102 and bands 104. In one preferred embodiment, sleeve 106 comprises heat-shrink tubing, however any sleeve 106 can be made from any pliable, shrinkable material regardless of the method of shrinking, whether, by way of example and not limitation, heat, chemical reaction, exposure to light, exposure to moisture or other solvent, or the like. The sleeve may have a smooth or textured surface. Sleeve 106 is then subjected to its shrinking process via hot air provided by heat gun 108 to tighten sleeve 106 over handle 102 and bands 104 thus creating a ribbed, elastomeric gripping surface 402 (FIG. 4) without adding substantial circumference to handle 102.

Figure 2:
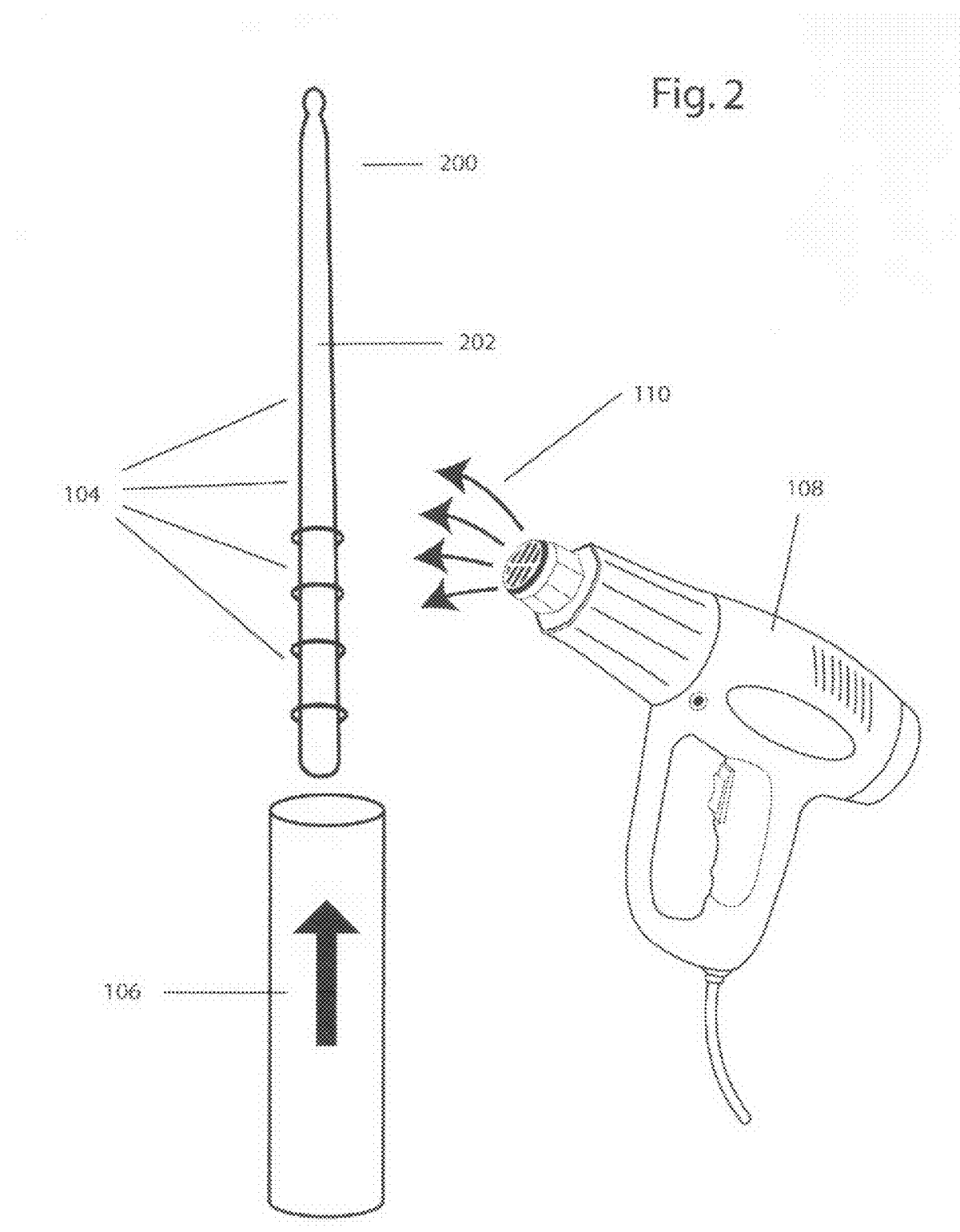
FIG. 2 depicts a preferred embodiment of the present invention as applied to a drumstick prior to shrinking the sleeve.

Turning to FIG. 2, it should be noted that the present invention is particularly well suited to improve the functionality of a drumstick or mallet as used by musicians to play percussion instruments. First, elastomeric bands 104 are placed over the handle 202 of drumstick 200. Afterward, sleeve 106 is placed over handle 202 and rings 104. As in the above embodiment, hot air 110 expelled by heat gun 108 is used to shrink tubing 106 and create a ribbed elastomeric gripping surface without adding substantial circumference to drumstick 202. It should be noted that no particular number of rings is required to achieve the present invention. In fact it has been found that some drummers prefer the feel of a wood handle over the feel of sleeve 106. In such cases, a single band 104 can be placed near the end of handle 202 with a relatively short sleeve 106 such that a single rib is produced below the drummers hand so that the rib will rest against the outside of the drummer's hand to prevent the drumstick from sliding through the hand. A further advantage of such a system is that the drumstick may be reversed and the rib may be used in lieu of a conventional mallet for symbols, bells, or the like.

Figure 3:
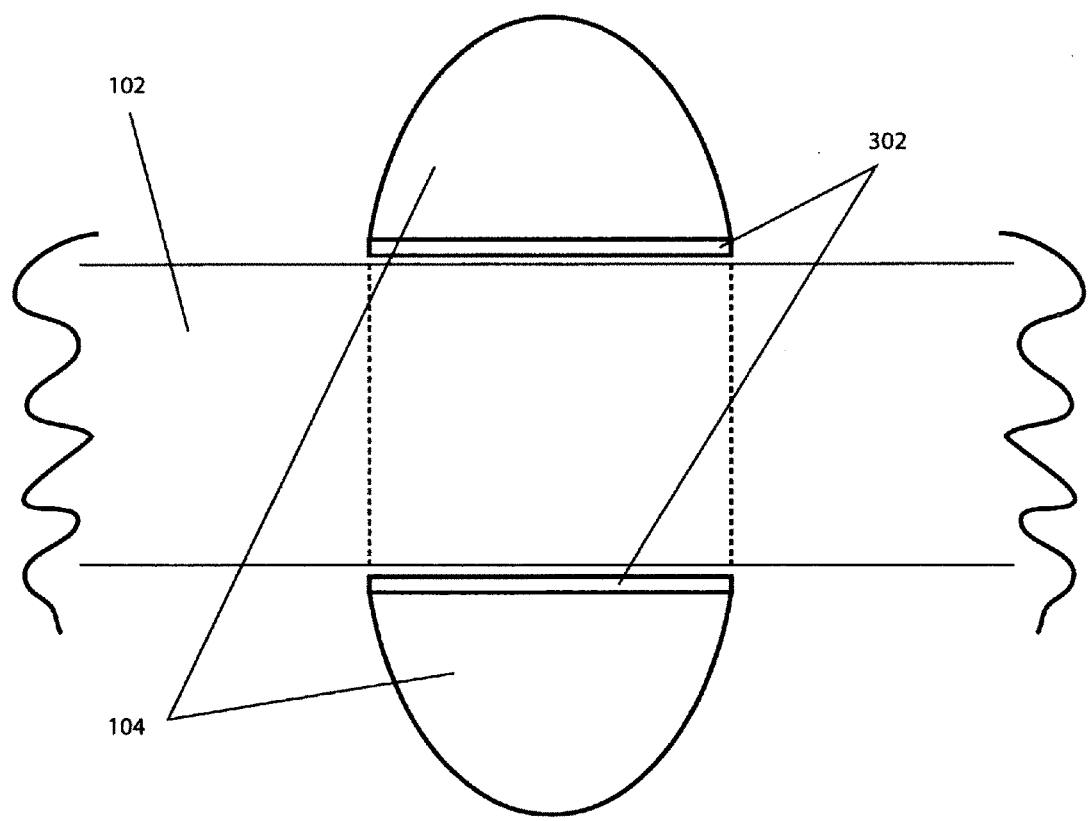
FIG. 3 shows a cross section of the elastomeric bands of FIG. 1 and an alternative preferred embodiment using adhesive to secure the elastomeric bands.

In yet another preferred embodiment as shown in FIG. 3, adhesive 302 may be placed either on handle 102 or band 104 such that band 104 is glued to handle 102 prior to placing sleeve 106 (FIG. 1) over handle 102. Not only does such a scheme reduce the risk of movement of a band 104 during the assembly process, it reduced the risk that band 104 might creep during use of the tool, implement, or instrument.

As will be apparent to those of ordinary skill in the art, the present invention is subject to a number of modifications that are within the scope and spirit of the present invention.

Thus it can be seen that the present invention is well suited to overcome the needs and alleviate the problems associated with prior art devices.

What is claimed is:

1. A grip for a manual tool, instrument, sporting grip, or implement having a handle comprising: an elastomeric band placed over the handle; and a shrinkable sleeve placed over said elastomeric band and the handle, wherein when said shrinkable sleeve is shrunk, a ribbed gripping surface is produced.

2. The grip of claim 1 wherein said shrinkable sleeve comprises heat-shrink tubing.

3. The grip of claim 2 further comprising a plurality of elastomeric bands placed over the handle and wherein said shrinkable sleeve covers said plurality of elastomeric bands.

4. The grip of claim 1 wherein said tool, instrument, or implement comprises a drumstick.

5. An improved tool, implement, or instrument of the type having a smooth handle, said improvement comprising: an elastomeric band placed over the handle; and a shrinkable sleeve placed over said elastomeric band and the handle, wherein when said shrinkable sleeve is shrunk, a ribbed gripping surface is produced.

6. The improved tool, implement, or instrument of claim 5 wherein said shrinkable sleeve comprises heat-shrink tubing.

7. The improved tool, implement, or instrument of claim 5 further comprising a plurality of elastomeric bands placed over the handle and wherein said shrinkable sleeve covers said plurality of elastomeric bands.

8. A method for applying a gripping surface to a handle comprising the steps of:
   a. placing one or more elastomeric bands over the handle;
   b. placing a shrinkable sleeve over said bands and the handle; and
   c. shrinking said shrinkable sleeve
   wherein said shrinkable sleeve of step (b) comprises heat-shrink tubing and
   wherein step (c) further includes applying heat to said heat-shrink tubing to shrink said shrinkable sleeve.

9. An improved gripping surface for a drumstick having a handle, the improvement comprising: one or more elastomeric bands placed over the handle; and a shrinkable sleeve placed over said elastomeric bands and said handle, wherein when said shrinkable sleeve is shrunk, a ribbed gripping surface is produced on the handle.

* * * * *